No. 814,614. PATENTED MAR. 6, 1906.
G. MATTESON.
MILK COOLER.
APPLICATION FILED JUNE 23, 1904.
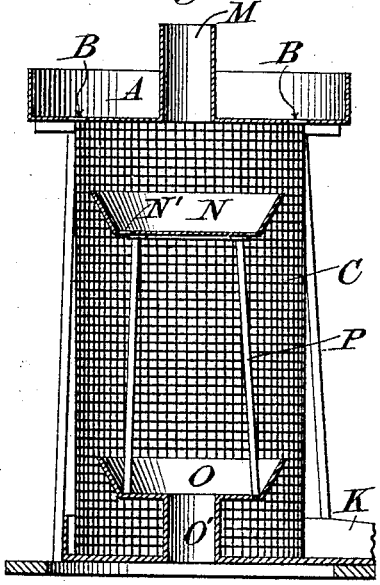
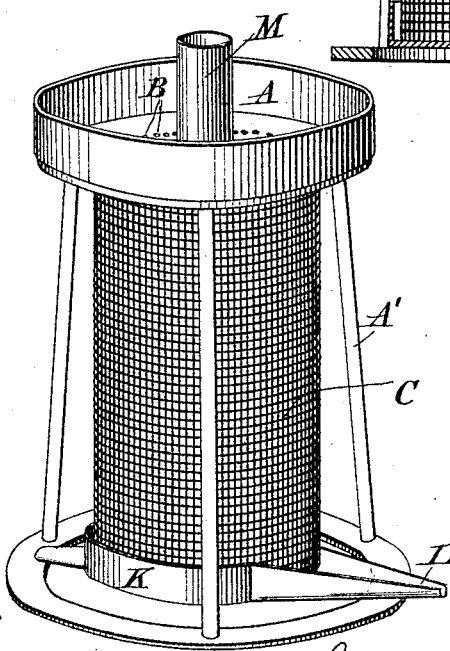
Witnesses:
E. S. Sheley
Wm Hagen
Inventor:
George Matteson

UNITED STATES PATENT OFFICE.

GEORGE MATTESON, OF NEAR COLVIN, ILLINOIS.

MILK-COOLER.

No. 814,614.  Specification of Letters Patent.  Patented March 6, 1906.

Application filed June 23, 1904. Serial No. 213,904.

*To all whom it may concern:*

Be it known that I, GEORGE MATTESON, a citizen of the United States, residing near Colvin, in the county of Dekalb, State of Illinois, have invented new and useful Improvements in Milk-Coolers, of which the following is a specification.

My invention relates to means to cool, aerate, deodorize, and purify milk or other liquid; and the object thereof is to provide simple means whereby these operations may be performed. I accomplish these objects by the mechanism described herein and shown in the accompanying drawings, in which—

Figure 1 is a perspective view of a device embodying my invention. Fig. 2 is a central longitudinal section of the device shown in Fig. 1.

In the drawings, A represents the receptacle, supported by the uprights A', into which the milk is poured, in the bottom of which is a row of holes B, through which the milk or other liquid slowly passes and trickles down onto the screen C, preferably made of wire-netting. In dropping from one wire to the other of the screen the milk or other liquid is broken up into drops which are tumbled and changed in formation as they drop down the screen into the pan K, upon which the screen rests, thereby presenting a new surface to the air. The spout L facilitates the drawing off of the liquid into any convenient receptacle (not shown) placed below. In the center of the milk-receptacle A is a cylindrical tube M, which rises above the outer rim of the receptacle A. Directly below this tube and inside the screen C is a pan N, in which water or ice or any other cooling agent may be placed. The water will drop through the holes N', arranged in a circle of such size that it will fall into the funnel-shaped pan O, disposed below, having in the bottom thereof the cylindrical outlet O'. The pan N is supported in proper position by uprights P. The water in dropping from the pan N to the pan O will perform the same office as heretofore described. Any convenient receptacle may be placed below the outlet O' to catch the waste water.

Having described my invention, what I claim as new, and desire to secure by Letters Patent, is—

The herein-described means to cool milk, or other liquids, comprising the cylindrical wire screen C, provided with a liquid-receptacle A on the top thereof, having holes B in the bottom thereof, so disposed therein as to drop the liquid therethrough directly upon the upper end of the wire screen; a bottom receptacle K to receive the liquid provided with a spout L; a centrally-mounted ice-receiving pan N in the top thereof; a liquid-receiving pan O disposed below the same and provided with a discharge-opening O' substantially as and for the purpose herein shown and described.

In witness that I claim the foregoing I have hereunto subscribed my name this 20th day of June, 1904

GEO. MATTESON.

Witnesses:
 IVAR JOSDICK,
 ELLEN GLEASON.